(12) United States Patent
Nguyen et al.

(10) Patent No.: US 8,692,123 B2
(45) Date of Patent: Apr. 8, 2014

(54) ELECTRICAL DEVICE WITH POWER CORD INSERT

(75) Inventors: Thanh Nguyen, Hattiesburg, MS (US); Leonard C. Johnson, Hattiesburg, MS (US)

(73) Assignee: Sunbeam Products, Inc., Boca Raton, FL (US)

( * ) Notice: Subject to any disclaimer, the term of this patent is extended or adjusted under 35 U.S.C. 154(b) by 105 days.

(21) Appl. No.: 13/494,267

(22) Filed: Jun. 12, 2012

(65) Prior Publication Data

US 2012/0329310 A1 Dec. 27, 2012

Related U.S. Application Data

(60) Provisional application No. 61/499,540, filed on Jun. 21, 2011.

(51) Int. Cl.
*H01B 17/26* (2006.01)

(52) U.S. Cl.
USPC ...................................... 174/153 R

(58) Field of Classification Search
USPC ............................ 174/153 R, 153 G; 439/553
See application file for complete search history.

(56) References Cited

U.S. PATENT DOCUMENTS

| | | | |
|---|---|---|---|
| 342,856 A | 6/1886 | Barrett | |
| 2,223,153 A | 11/1940 | Seifer | |
| 2,816,951 A | 12/1957 | Sperry | |
| 2,895,003 A | 7/1959 | Rapata | |
| 2,902,536 A | 9/1959 | Huth | |
| 2,930,840 A | 3/1960 | Klumpp, Jr. | |
| 3,521,269 A * | 7/1970 | Gentelia et al. | 341/138 |
| 4,034,944 A * | 7/1977 | Moran | 248/56 |
| 4,077,085 A * | 3/1978 | Yuda | 174/153 G |
| 6,484,358 B1 | 11/2002 | Duong et al. | |
| 2010/0300366 A1 | 12/2010 | Lipscomb et al. | |

* cited by examiner

*Primary Examiner* — Phuong Dinh
(74) *Attorney, Agent, or Firm* — Michael J. Corrigan

(57) ABSTRACT

An electrical device including an electrical power cord secured to a base of the electrical device by using a plug having a pair of resilient prongs. The plug is inserted into an opening in the base to secure a strain reliever on an end of the electrical power cord into the opening. The resilient prongs flex towards each other when the plug is inserted into the opening. The prongs return to their original positions after passing through the opening and seat the plug in the opening. When seated, the plug secures the strain reliever into the opening thereby securing the electrical power cord to the base.

12 Claims, 2 Drawing Sheets

ELECTRICAL DEVICE WITH POWER CORD INSERT

CROSS-REFERENCE TO RELATED APPLICATION

The present application claims priority to U.S. Provisional Patent Application No. 61/499,540 filed Jun. 21, 2011, entitled "Power Cord Snap".

FIELD OF THE INVENTION

The invention relates to electrical devices. More particularly, the invention is relates to an electrical power cord insert for securely attaching an electrical power cord to an electrical device such as a kitchen appliance.

BACKGROUND OF THE INVENTION

Typically, electrical devices such as kitchen appliances are manufactured and assembled on a production line by workers who in succession add additional parts to each device as the devices move along the production line in various stages of assembly. Parts usually are assembled to each device by installing individual parts into their appropriate position followed by screws or other fasteners which must be then be manipulated either by hand or by automated tools. Most of these devices require an electrical power cord which is assembled with a power cord strain reliever which must be positioned in an opening formed between opposing housing portions prior to the housing portions being assembled together. This requires both labor and the time of assembly line workers. Thus, the need exists for a simplified power cord strain reliever and method of assembly thereof on an electrical device.

SUMMARY OF THE INVENTION

In an embodiment, there is provided an electrical device including a base portion having at least one electrically powered component disposed in an interior volume thereof, an opening in the base portion having a pair of projections on opposing ends of the opening, an electrical power cord connected to the at least one electrically powered component and passing through the opening, a strain reliever attached to the electrical power cord, and a plug that secures the strain reliever to the base portion when inserted into the opening after the strain reliever has been fitted through the opening.

In an embodiment, there is provided a plug for securing an electrical power cord to a base of an electric device including a base, a pair of resilient prongs extending upwardly from the base, and a lip on each prong, wherein the plug is inserted into an opening in the base after a strain reliever embedded on one end of the electrical power cord is passed through the opening and seated over the opening, said plug securing the strainer reliever into position by engaging a projection on the base portion and the strain reliever.

In an embodiment, there is provided a method of securing an electrical power cord to an electrical device including the steps of passing a strain reliever attached to one end of the electrical power cord through an opening in a base of the electrical device, positioning the strain reliever over the opening such that edges of the strain reliever are seated over the opening preventing the strain reliever from being pulled back through the opening, and inserting a plug into the opening such that the strain reliever is wedged between one of a pair of projections on opposing ends of the opening and one side of the plug and another side of the plug is wedged against the other of the pair of projections.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
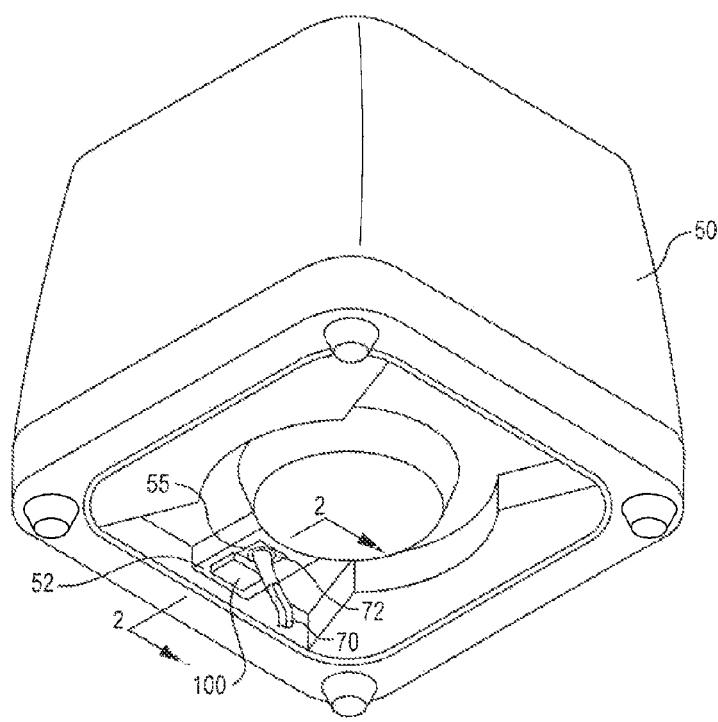
FIG. 1 is a bottom perspective view of an electrical device base portion having and electrical power cord attached to the base-portion using a snap-in insert.

Referring now to the drawing figures in which like reference designators refer to like elements, there is shown in FIG. 1 an exemplary embodiment of a base portion 50 of an electrical device such as a kitchen appliance having an electrical power cord 70 installed in an opening 55 in a bottom wall 52 thereof. The electrical device may be a kitchen appliance such as a blender, food processor, juicer/extractor, toasters, hot beverage maker such as coffee or latte/cappuccino maker, electric can openers, ice cream makers but this not meant to be limiting. In other embodiments the electrical device may not include such a base portion but have a suitable position on a housing where an opening is formed where the electrical power cord may be attached. These electrical devices may include power tools, household appliances, computers, office equipment, televisions, vacuum cleaners, air conditioners, etc., but this is not meant to be limiting. The base portion 50 houses at least one electrical component such as an electrical motor (not shown) disposed in an interior volume (not shown) thereof that is provided electrical power via the electrical power cord 70.

The electrical power cord 70 may be an electrical power cord suited for supplying 120 vac, 240 vac, 12 Vdc, 24 Vdc or other quantity electrical voltage which may have a plug (not shown) on the opposite end or directly wired to a source of electrical power. The electrical power cord 70 may include a rectangular "T" strain reliever 72 integrally molded or attached near the distal end 71 (FIG. 2) that is connected to a load such as an electrical motor (not shown) disposed in the base portion 50. The "T" strain reliever 72 is inserted into a rectangular opening 55 formed in a bottom wall 52 of the base portion 50 during assembly and secured therein by a snap-in plug or insert 100.

Figure 2:
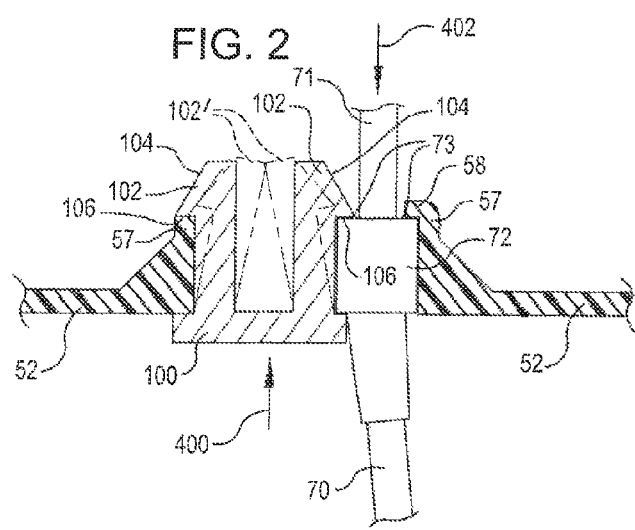
FIG. 2 is a cross-section taken along line 2-2 of FIG. 1 of the snap-in insert securing the strain reliever of the electrical power cord in an opening formed in a bottom wall of the base portion of FIG. 1.
Figure 3:
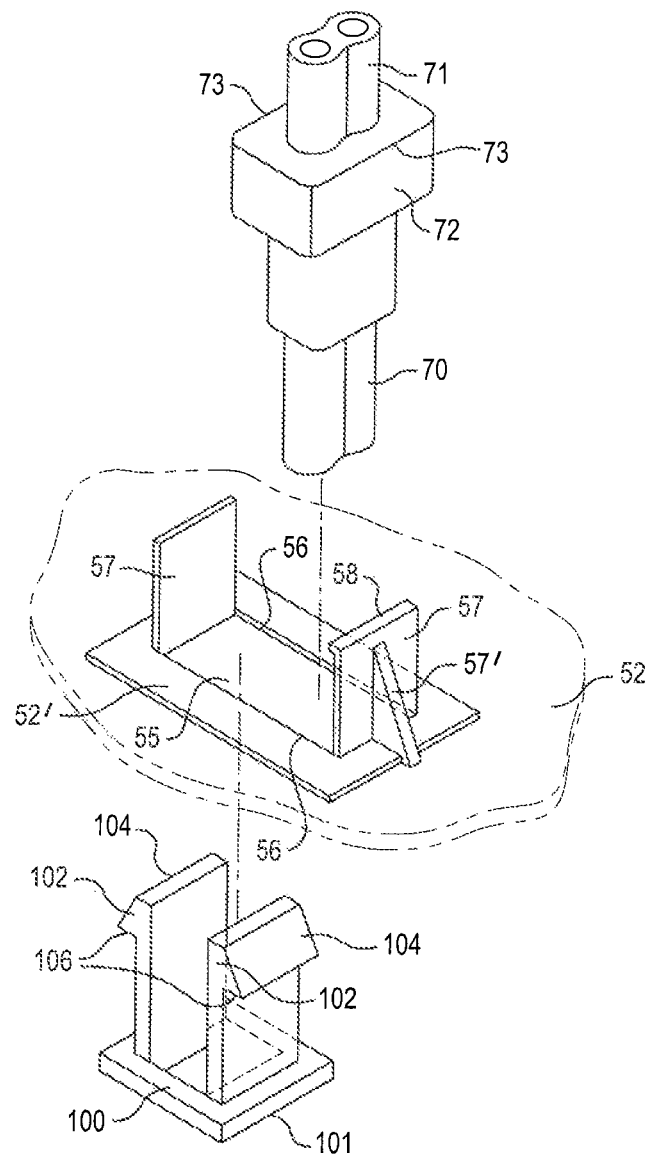
FIG. 3 is an exploded perspective view of the snap-in insert and electrical power cord strain reliever assembly of FIG. 2 removed from the bottom wall of the base portion.

Referring now to FIGS. 2 and 3, during assembly of the electrical device the distal end 71 of the electrical power cord 70 is inserted into the rectangular opening 55 (best seen in FIG. 3) in the base portion 50 by rotating the "T" rectangular strain reliever 72 an angle of 90° so that its longitudinal axis is aligned with the longitudinal axis of the rectangular opening 55. This allows the "T strain reliever 72 to pass through the opening 55. Once through the opening 55, the "T strain reliever 72 is again rotated an angle of 90° so that its longitudinal axis is transverse to the longitudinal axis of the opening 55. The "T strain reliever 72 is now prevented from being pulled back through the opening 55 because the opposing edges of the "T strain reliever 72 overlap the opposing edges 56, 56 of opening 55 formed by the bottom wall 52. One side of the "T strain reliever 72 is disposed adjacent a projection or first abutment 57 on a first end of the opening 55. The first abutment 57 includes a lip 58 that engages an upper edge 73 of the "T strain reliever 72. The lip 58 prevents the "T strain reliever 72 from being moved into the interior of the base portion 50.

A plug or snap-in insert 100 may now be inserted in the direction of arrow 400 into the opening 55 next to the "T strain reliever 72. The snap-in insert 100 may be made from any suitable non-absorbent liquid-resistant material known to one of ordinary skill in the art such as metal, plastic such or polypropylene, etc. that can be formed and is resilient. A pair of resilient prongs 102, 102 extending from a base 101 of the snap-in insert 100 may temporarily flex to the positions designated by 102', 102' until seated in the position illustrated in FIG. 2. Once seated, the prongs 102, 102 return to their original positions such that one prong 102 engages the top edge 73 of the "T strain reliever 72. The other prong 102 engages another projection or second abutment 57 on the opposing end of the opening 55. As a result, the "T strain reliever 72 remains locked into place on the interior volume side of the opening 55 of base portion 50 even if the electrical power cord is pulled in the direction of arrow 402. The "T strain reliever 72 remains locked into place unless the prongs 102, 102 are moved again to the positions shown as 102', 102' which may or may not be possible depending on whether the interior of base portion 50 is sealed. The first and second abutments 57, 57 may extend from the bottom wall 52 directly or a plate 52' attached to the bottom wall 52. Each of the first and second abutments may be reinforced using a reinforcing member 57'.

Each of the prongs 102, 102 may includes a respective tapered surface 104, 104 to facilitate inserting the plug 100 into the opening 55. As the plug 100 is inserted into the opening 55, one of the surfaces 104 is urged against one end of the opening 55 and the other of the surface 104 is urged against one side of the strain reliever 72. This causes the prongs 102, 102 to flex to the positions 102', 102' until the lips 106, 106 of the prongs pass by the abutment 57 and the top edge 73 of the strain reliever 72. Once the lips 106, 106 pass by the abutment 57 and the top edge of 73 of the strain reliever 72, the prongs 102', 102' can return to their original positions 102, 102. When the prongs 102, 102 return to their original position, the lips 106, 106 are seated on the abutment 57 and the top edge 73 of the strain reliever 72. In addition, the base 101 of the plug 100 is seated against the bottom wall 52 of the appliance 100 and a bottom edge of the strainer reliever 72 causing the strain reliever 72 to be wedged into the opening 55 by the plug 100. The electrical power cord 70 and the strain reliever 72 are now secured to the base portion 50 of the electrical device.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. An electrical device, comprising:
    a base portion having at least one electrically powered component disposed in an interior volume thereof;
    an opening in the base portion having a pair of projections on opposing ends of the opening;
    an electrical power cord connected to the at least one electrically powered component and passing through the opening;
    a strain reliever attached to the electrical power cord; and
    a plug that secures the strain reliever to the base portion when inserted into the opening after the strain reliever has been fitted through the opening and into engagement with one of the projections.

2. The electrical device of claim 1,
    wherein the strain reliever when inserted into the opening is wedged between one of the pair of projections and one side of the plug and another side of the plug is wedged against the other of the pair of projections.

3. The electrical device of claim 1, further comprising:
    a pair of resilient prongs extending from a base of the plug;
    wherein the pair of resilient prongs each have a tapered surface that causes the pair of resilient prongs to flex towards each other when the plug is being inserted into the opening.

4. The electrical device of claim 3, wherein the pair of resilient plugs flex back to their original positions after the plug has been inserted into the opening.

5. The electrical device of claim 4, further comprising a lip on each of the pair of resilient prongs, wherein one of lips engages one of the projections and the other lip engages the strain reliever when the plug is inserted into the opening.

6. The electrical device of claim 4, further comprising a lip on one of the projections that engages the strain reliever when the plug is inserted into the opening.

7. A plug for securing an electrical power cord to a base of an electrical device, comprising:
    a base; and
    a pair of resilient prongs extending upwardly from the base;
    wherein the plug is inserted into an opening in a base portion of the electrical device after a strain reliever embedded on one end of the electrical power cord is passed through the opening and seated over the opening, said plug securing the strainer reliever to the base portion by engaging a projection on the base portion and the strain reliever.

8. The plug of claim 7, further comprising:
    a lip on each of the pair of prongs;
    wherein one of the lips engage the projection on the base portion and the other lip engages the strain reliever.

9. The plug of claim 7, wherein each of the pair of resilient prongs include a tapered surface, said tapered surfaces engaging opposing edges of the opening as the plug is inserted into the opening causing the resilient prongs to flex towards each other allowing the plug to pass through the opening.

10. A method of securing an electrical power cord to an electrical device, comprising:
    passing a strain reliever attached to one end of the electrical power cord through an opening in a base of the electrical device;
    positioning the strain reliever over the opening such that edges of the strain reliever are seated over the opening preventing the strain reliever from being pulled back through the opening; and
    inserting a plug into the opening such that the strain reliever is wedged between one of a pair of projections on opposing ends of the opening and one side of the plug and another side of the plug is wedged against the other of the pair of projections.

11. The method of claim 10, further comprising:
    urging tapered surfaces on each of a pair of resilient prongs on the plug against one side of the opening and the strain reliever when the plug is being inserted into the opening to cause the resilient prongs to flex toward each so that the plug may pass through the opening and be seated in the opening.

12. The method of claim 11, further comprising:

engaging a lip on one of the prongs with one of the projections on one end of the opening and engaging a lip on the other prong with a top of the strain reliever when the plug is seated in the opening.

* * * * *